(No Model.)
H. TOLLNER.
METAL BORDERED GLASS SIGN OR PLATE.
No. 433,107. Patented July 29, 1890.
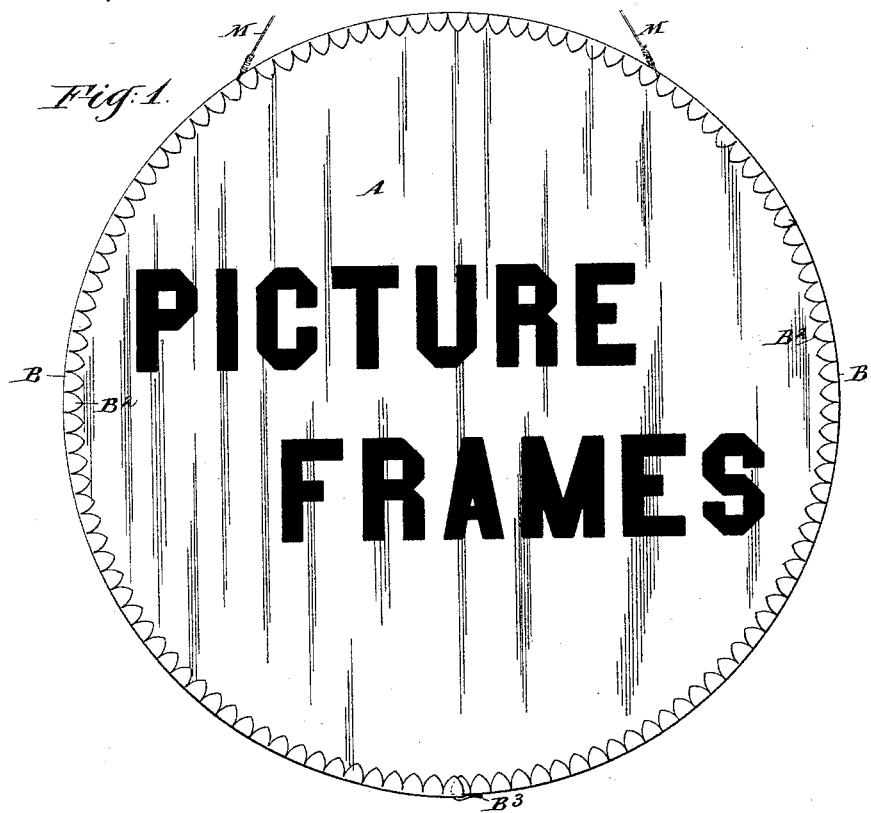
Fig. 1.
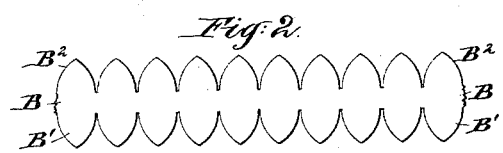
Fig. 2.
Fig. 3.
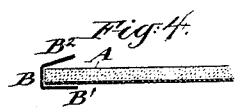
Fig. 4.
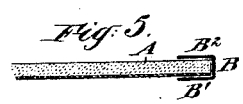
Fig. 5.
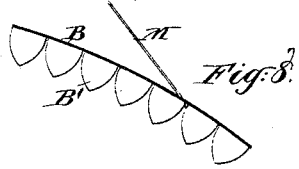
Fig. 8.
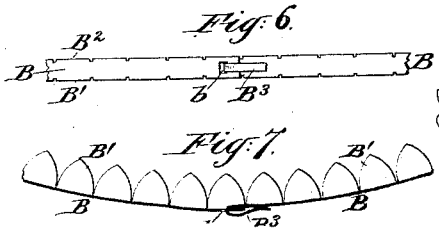
Fig. 6.
Fig. 7.
Witnesses:
Charles R. Searle.
H. A. Johnstone.
Inventor:
Hugo Tollner
by his attorney
Thomas Drew Stetson

UNITED STATES PATENT OFFICE.

HUGO TOLLNER, OF BROOKLYN, NEW YORK.

METAL-BORDERED GLASS SIGN AND PLATE.

SPECIFICATION forming part of Letters Patent No. 433,107, dated July 29, 1890.

Application filed September 18, 1889. Serial No. 324,296. (No model.)

*To all whom it may concern:*

Be it known that I, HUGO TOLLNER, of the city of Brooklyn, Kings county, in the State of New York, have invented a certain new and useful Improvement in Glass Signs and Analogous Glass Plates with Metal Borders, of which the following is a specification.

There are difficulties in applying metallic edgings or frames to glass plates, due to the nature of the material inclosed and the liability to fracture from severe compression or from heat applied in soldering. The difficulty is not lessened when the contour of the whole or a portion of the edge of the glass is curved. I have discovered that the metal may be made of such form and weight as to be easily conformed to a circular edge and to take hold of a sufficient surface on each face thereof without serious compressive strain and that the ends may be efficiently joined without solder. The metal may be thus reliably attached and the whole present a tasty appearance with all the facilities for suspending by a wire or cord, which are necessary to enable the article to serve as an advertisement or for any other ordinary purpose for which glass thus edged may be required.

My invention applies to circular, elliptical, or other approximately circular plates of glass, and also to plates which are partially square or parallelograms with rounded corners.

The invention may be applied with any form of glass plate of which all or a portion of the edge is curved.

The accompanying drawings form a part of this specification and represent what I consider the best means of carrying out the invention.

Figure 1 is a face view of the completed sign. The succeeding figures are on a larger scale. Fig. 2 shows a piece of the metal border cut to the proper form, but not yet applied. Fig. 3 is a cross-section of a portion of the sign partly made. Fig. 4 is a corresponding section showing the work more advanced, and Fig. 5 is a corresponding section showing the work completed. Fig. 6 is an edge view of the junction completed. Fig. 7 is a section through the metal after it is completely formed. The section is in the plane of the center of the thickness of the glass. Fig. 8 is a corresponding section at another part of the periphery of the completed sign.

Similar letters of reference indicate corresponding parts in all the figures where they occur.

A is a sheet of glass of uniform or approximately uniform thickness with the whole or a portion of the edge smoothly curved.

B B' B² is a strip of rolled brass, both edges of which have been cut by suitable machinery into small and gracefully-shaped scallops. One of these edges B' is bent at right angles to the remaining portion. This may be done by hand or by machinery while the strip is in a straight condition. The metal strip is cut to a length only a little in excess of that required to extend around the edge of the glass. A hole $b$ is punched or otherwise produced in the part B at one end. A corresponding tongue B³ is produced on the other end of the strip. This tongue is inclined outward at an angle, and the entire strip is bent to a form corresponding to the contour of the glass. Now the tongue B³ is inserted through the hole $b$, and the device lying on a table or bench, the glass is inserted, and the projecting tongue B³ being seized by pliers or otherwise is tightly drawn through the hole and folded backward. This brings the main body B into tight union with the edge of the glass, leaving the scalloped edge B² standing upward. Next, the whole is subjected to the treatment of a die, which deflects the edge B² inward and presses it nearly down upon the glass. Then a final flattening being done by hand with a soft-faced hammer or other convenient appliance the framed article is complete.

M is a fine suspending-wire thrust across under the metal frame. This may in most cases be introduced before the glass is applied. It serves the ordinary function by which the device may be suspended from a nail or other device. (Not shown.)

The last edge can be partly folded down before the ends of the metal are joined, if preferred. The folding down of this edge can be done entirely by hand, if preferred, using either the pressure of the fingers direct or striking gentle blows with a soft-faced hammer. When only a small number of the articles of a given size are to be treated, such practice will be preferable.

Modifications may be made without departing from the principle or sacrificing the advantages of the invention. I can apply other material, as paper, on one face of the glass. I can thus use glass with silvered surfaces, the paper or other addition being placed on the silvered side.

If sufficient care be taken to avoid wrinkles, the edge B', which is formed before the glass is introduced, may be only slightly scalloped or not scalloped at all. The scalloping of the edge $B^2$, which is last folded down, is important, both to improve the appearance and to facilitate the folding of the metal without injury to the fragile glass upon which it is to be tightly set.

I claim as my invention—

The glass A, having a circular contour inclosed within the thin metallic strip B, with flanged edges B' $B^2$, one of which is scalloped, in combination with each other and with the joining-tongue $B^3$ on one end, engaged in a hole $b$ near the other end and secured by folding, all substantially as herein specified.

In testimony whereof I have hereunto set my hand, at Brooklyn, New York, this 12th day of February, 1889, in the presence of two subscribing witnesses.

HUGO TOLLNER.

Witnesses:
EDWARD SHEFFIELD,
ARTHUR R. THOMPSON.